Nov. 16, 1965  A. K. CHITAYAT  3,217,589
FIBER OPTICS IMAGE ENHANCEMENT MEANS WITH IMAGE ROTATION
Filed May 15, 1962
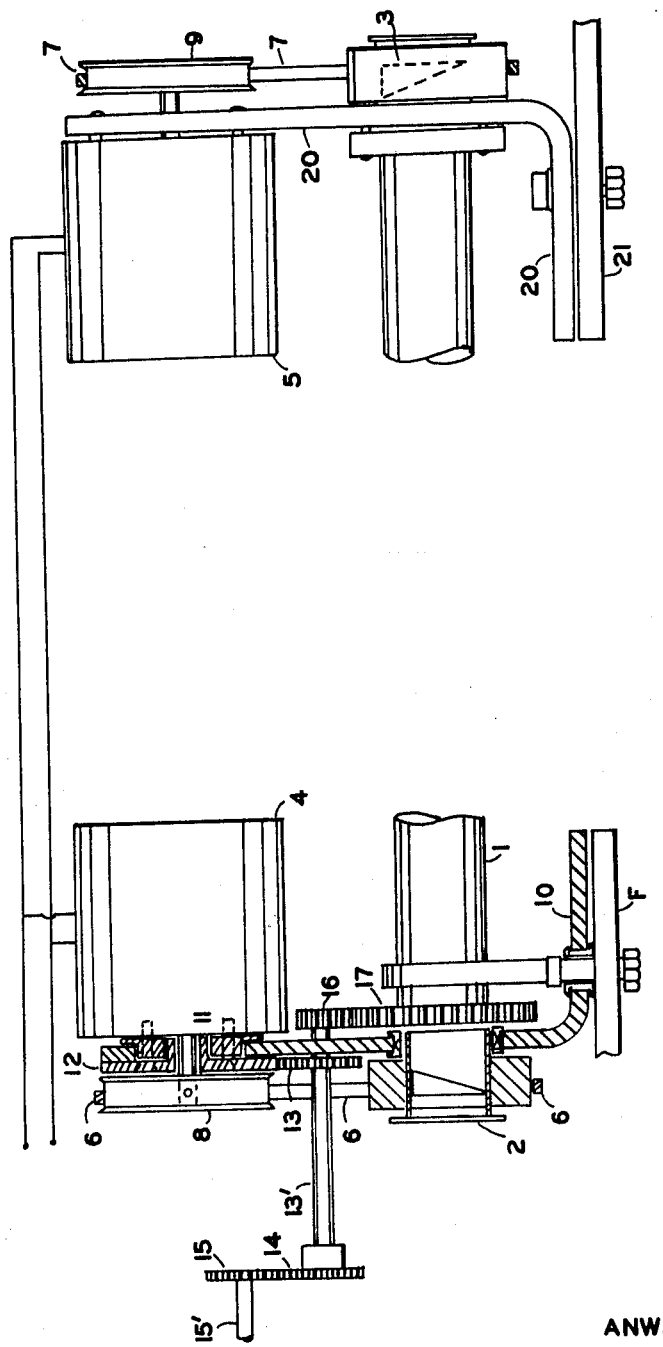
INVENTOR.
ANWAR K. CHITAYAT
BY James P. Malone

United States Patent Office 3,217,589
Patented Nov. 16, 1965

3,217,589
FIBER OPTICS IMAGE ENHANCEMENT MEANS WITH IMAGE ROTATION
Anwar K. Chitayat, Plainview, N.Y., assignor to Optomechanisms, Inc., Plainview, N.Y.
Filed May 15, 1962, Ser. No. 194,940
3 Claims. (Cl. 88—1)

This application is a continuation-in-part of my prior copending applications entitled Image Enhancement Means, S.N. 116,179, filed June 9, 1961, now abandoned, and S.N. 148,258, filed October 27, 1961.

This invention relates to fiber optic image transmitting means and more particularly to means for minimizing image deterioration due to fiber structure and broken fibers in the cable.

More particularly the invention relates to synchronous motor means for nutating an image at the beginning of a fiber optic cable and phase locked synchronous motor means for nutating the image at the output of the cable. The net result is that the image being transmitted through the cable appears stationary. However, the image of the cable itself, i.e., broken fibers and spaces between fibers, is no longer recognizable. One of the motors has its cage rotatably mounted.

The present state of the art of flexible fiber cables is such that a good quality image cannot be transmitted through a flexible fiber cable (fiberscope). The reason for this is actual manufacturing difficulties whereby spaces are observed between the fiber bundles in addition to quite a few broken fibers throughout the section of the cable. Consequently, it is proposed that the transmission qualities of the fiber cable be enhanced by means outside the cable.

The proposed technique is to integrate the image transmitted through the fiber cable over a large section of the fiber cable. In other words, if a person were to take the fiber cable and vibrate it around the axis at extremely high rates, then he would see an image which is far superior than if the cable were not to vibrate. However, this vibration is not practical in almost all situations where a fiber cable is to be used. The proposed approaches to the problem may then be solved by actually rotating optical elements at the two ends of the fiber cable. A first wedge is placed close to the entrance of the fiber cable. This wedge displaces the image by a fixed distance. Now, if one rotates the wedge about its center then the image nutates, i.e., describes a circle. Other means of tilting and nutating an image may be used such as inclined mirrors, prisms, lenses, and poly sided variations thereof.

At the exit of the fiber cable a similar wedge configuration is repeated to displace the image back to the original optical axis. The two wedges are rotated in phase synchronism, for instance at 3600 r.p.m. Consequently, the image observed at the exit is not changed by the introduction of the entrance and exit wedges. Thus, if the entrance wedge is rotated in synchronism with the exit wedges, the image transmitted through the cable would look stationary. Broken optical fibers, observed at the exit, would show up as an image which is rotated in a circle due to the existence of exit wedges. The broken fiber would then show up as a rotated circle. If this rotated circle has a circumference 100 times as large as the fiber diameter, then the loss of illumination at any portion of the cable would be approximately 1%. In other words, there will be little or no effect on the optical quality of the image due to the existence of broken fibers.

The method of synchronization of the entrance and exit wedges can be done in one of the following manners:

(1) Flexible shaft drive: Here one motor is used to drive both entrance and exit wedges which are connected together by a flexible shaft. This method was described in my first aforementioned application.

(2) Servo drive: Several servo drive systems can be used whereby a synchro or a potentiometer or any other angular measuring device can be attached to one of these wedges which is driven by a constant speed motor. The other set of wedges is servoed to the first through a repeater synchro and a servo motor. Consequently, as one set of wedges rotates, the other follows in the same manner. This was described in my second above mentioned application.

(3) Adjustable phase synchronous motors: In this application two synchronous motors are used, one on each side, which are phase locked to the supply frequency. Now, due to the fact that both motors are synchronized to the same frequency, they will rotate in synchronism. The cage of one of the motors is adjustably rotatably mounted and geared to a control adjustment.

One of the purposes of this invention is to provide the capability of rotating the image of the fiber cable in order to orient it in any manner. This requirement is of particular importance in photo-interpretation viewers or periscope systems whereby it may be necessary to rotate the observed image in order to orient it in the desired manner. This technique of rotation of images is normally achieved in fiber optics by fixing one end of the cable and rotating the other end. However, this rotation, if not compensated for, would shift the relative phase of the rotating wedges, with a resultant loss of resolution and deterioration of the image through the cable.

Therefore, one object of the invention is to provide means of rotating one end of the cable relative to the other, and means to compensate for the shift of phase due to this rotation.

Another object of the invention is to provide new and improved image transmitting means.

Another object of the invention is to provide new and improved image transmitting means using fiber optic cables.

Another object of the invention is to provide new and improved image transmitting means using fiber optic cables, means to nutate the input image to a cable and means to nutate the output image from the cable so that any image deterioration due to broken fibers and fiber structure are integrated and minimized.

Another object of the invention is to provide new and improved image transmitting means comprising a fiber optic cable and means to integrate the transmitted light so that loss of quality due to broken fibers is minimized, comprising motor means to rotate the image in phase synchronism at the input and output of said cable, and means to adjust the relative phase of the motors, and means to adjust the cage of one of the motors, to rotate the image without disturbing the phase relation.

Another object of the invention is to provide new and improved means to displace the image at the input of a fiber optic cable, means to nutate said displaced image relative said cable and means at the output of said cable to nutate said image to restore said image to its original condition, and phase adjustable means to rotate said input and output means in synchronism.

These and other objects of the invention will be apparent from the following specification and drawings, of which The single figure is an elevational view partially in section of an embodiment of the invention.

Referring to the figure, the invention comprises a fiber-optic cable 1 which is adapted to transmit images from one end to the other. Optical means 2 and 3 are rotatably mounted at each end of the cable for the purpose of nutating the image. The optical elements are rotated by means of the polarized synchronous motors 4 and 5 mounted at each end of the cable. The motors are connected to rotate the optical elements by means of the belts 6 and 7 which are mounted on pulleys 8 and 9 connected to the motor shafts, the other end of the belts being connected to the rotatable elements 2 and 3.

The main difficulty with this type operation is that the motors and optical elements must be maintained in phase synchronism independent of the rotation of one end of the cable relative to the stationary end. Once the proper phase is established the motors maintain the proper phase since they are synchronous. In order to establish the proper phase of the operating conditions the cage of the motor 4 is rotatably mounted on the bracket 10 by means of the flange 11 and gear 12. The flange 11 is rotatably fitted to the bracket so that the cage of the motor may be rotated by turning the gear 12 by means of the connecting gear 13, which may be operated from a remote location if desired by means of the gear 14 connected to gear 13, gear 15 meshing with gear 14 and a flexible drive shaft 15' connected to gear 15. The bracket 10 is anchored to a suitable stationary frame F. Shaft 13' is journaled to bracket 10. On the shaft 13' for gears 13 and 14, is connected gear 16 which rotates one end of the fiber cable 1 which is connected to gear 17 fixedly connected to one end of the cable. Consequently, the same mechanisms that rotate the stator of the motor 4 also rotate the end of the cable. Thus, if the cable is rotated by any angle, the motor housing is also rotated by the same angle, and therefore the phase of the wedge 2 relative to the image transmitted through the fiber cable is not affected.

The other motor 5 is mounted in conventional manner with its case fixedly connected to the bracket 20 which is mounted on a suitable frame 21. It is only necessary to adjust the cage of one of the motors in order to maintain the proper phase synchronism. Both of the motors are connected in parallel to a source of alternating voltage.

The cable 1 is clamped to the respective brackets 10 and 20 and it is stationary except that one end is adjustable in rotation. The optical elements 2 and 3 are then rotated in synchronism and the image is observed. Initially, the clarity and definition of the image may be improved to the maximum by rotating any of the wedges 2, 3, pulley drives 6, 7, 8, 9, or the motor stators, in order to achieve optimum phase synchronism. Now, if the shaft 15' is rotated manually or electrically, the fiber cable end can be turned to rotate the image. Optimum synchronism is then maintained due to the gear train 12, 13, 16 and 17.

Many modifications may be made by those who desire to practice the invention without departing from the scope thereof which is defined by the following claims.

I claim:
1. In image transmitting means utilizing a fiber optic cable, means to minimize the light loss due to broken or unevenly spaced fibers comprising input means at the beginning of said cable to displace an input image relative said cable, output means at the end of said cable to displace said image to restore said image to its original form, a pair of synchronous motor means connected to rotate said input and output means in synchronism, means to adjust the phase of said input and output means and means to rotate said image at one end of said cable without disturbing said phase adjustment, comprising means to simultaneously rotate one end of said cable and the stator of one of said motor means in synchronism.

2. In image transmitting means utilizing a fiber optic cable, means to minimize image deterioration due to broken or unevenly spaced fibers comprising input means at one end of said cable to displace an input image relative said cable, output means at the other end of said cable to displace said image to restore said image to its original form, synchronous motor means comprising separate motors connected to rotate said input and output means in phase synchronism, means to adjust the phase of said input and output means, bracket means to rotatably and adjustably mount the stator of one of said motors on said bracket means, means to rotatably connect one end of said cable on said bracket means, means for simultaneously orienting said one end of said fiber cable and said one motor stator comprising means to gear said one motor stator to said rotatable cable end whereby said image may be rotatably adjusted without disturbing said phase relation.

3. In image transmitting means utilizing a fiber optic cable, means to minimize image deterioration and light loss due to broken or unevenly spaced fibers comprising input means at the beginning of said cable to displace an input image relative said cable, output means at the end of said cable to displace said image to restore said image to its original form, synchronous motor means comprising separate motors connected to displace said input and output means in phase synchronism, bracket means, means to rotatably and adjustably mount the cage of one of said motors on said bracket, means to rotatably connect one end of said cable on said bracket means, and means for simultaneously orienting said one end of said fiber cable and said one motor cage comprising means to connect one of said cages to one end of said rotatable cable whereby said image may be rotatably adjusted without disturbing said phase synchronism relation.

References Cited by the Examiner

UNITED STATES PATENTS

| | | | |
|---|---|---|---|
| 2,166,947 | 7/1939 | Fayerweather | 318—437 |
| 2,843,005 | 7/1958 | Jones | 318—437 |
| 3,016,785 | 1/1962 | Kapany | 88—1 |
| 3,051,166 | 8/1962 | Havnanian | 88—1 X |
| 3,110,762 | 11/1963 | Frank | 88—1 X |

FOREIGN PATENTS 629,835  10/1961  Canada.

JEWELL H. PEDERSEN, *Primary Examiner.*